United States Patent
Sarangdhar et al.

(10) Patent No.: US 9,846,592 B2
(45) Date of Patent: Dec. 19, 2017

(54) VERSATILE PROTECTED INPUT/OUTPUT DEVICE ACCESS AND ISOLATED SERVICING FOR VIRTUAL MACHINES

(71) Applicant: Intel Corporation, Santa Clara, CA (US)

(72) Inventors: Nitin V. Sarangdhar, Portland, OR (US); Ioannis Yannis T. Schoinas, Portland, OR (US); Raul Gutierrez, Folsom, CA (US); Ravi Kolagotla, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/757,417

(22) Filed: Dec. 23, 2015

(65) Prior Publication Data

US 2017/0185434 A1 Jun. 29, 2017

(51) Int. Cl.
*G06F 9/45* (2006.01)
*G06F 13/28* (2006.01)
*G06F 13/10* (2006.01)
*G06F 9/455* (2006.01)

(52) U.S. Cl.
CPC ........ *G06F 9/45558* (2013.01); *G06F 13/102* (2013.01); *G06F 13/28* (2013.01); *G06F 2009/45579* (2013.01)

(58) Field of Classification Search
None
See application file for complete search history.

(56) References Cited

U.S. PATENT DOCUMENTS

| 9,501,157 | B2* | 11/2016 | Soffer | G06F 3/023 |
|---|---|---|---|---|
| 2009/0037908 | A1* | 2/2009 | Armstrong | G06F 12/1475 718/1 |
| 2009/0119087 | A1* | 5/2009 | Ang | G06F 9/45558 703/23 |
| 2009/0276551 | A1* | 11/2009 | Brown | G06F 13/102 710/72 |

(Continued)

OTHER PUBLICATIONS

Suzuki et al, Multi-Root Share of Single-Root I/O Virtualization (SR-IOV) Compliant PCI Express Device, 2010, IEEE, 18th IEEE Symposium on High Performance Interconnects, pp. 25-31.*

(Continued)

*Primary Examiner* — Abu Ghaffari
(74) *Attorney, Agent, or Firm* — Schwegman Lundberg & Woessner, P.A.

(57) ABSTRACT

Embodiments are directed to managing access to input/output devices by virtual machines (VMs). A first VM and a second VM are implemented. An I/O device controller driver has a first driver portion in the first VM and a second driver portion in the second VM. The first driver portion includes a configuration engine to configure the I/O device controller with I/O device-VM mappings, where a first I/O device is mapped exclusively to the first VM, and a second I/O device is mapped to at least the second VM. The second VM includes a general processing engine to call for I/O devices via the second driver portion, and in response to a call by the general processing engine for access to the first I/O device the second driver portion is to send an access request to the first driver portion.

25 Claims, 6 Drawing Sheets

(56) References Cited

U.S. PATENT DOCUMENTS

| | | | |
|---|---|---|---|
| 2011/0145814 A1* | 6/2011 | Mangione-Smith | G06F 9/5077 718/1 |
| 2011/0239213 A1* | 9/2011 | Aswani | G06F 9/45558 718/1 |
| 2012/0102491 A1* | 4/2012 | Maharana | G06F 9/45558 718/1 |
| 2013/0055259 A1* | 2/2013 | Dong | G06F 13/102 718/1 |
| 2013/0138840 A1* | 5/2013 | Kegel | G06F 13/28 710/22 |
| 2016/0124759 A1* | 5/2016 | Cattaneo | G06F 9/4411 719/327 |
| 2016/0378529 A1* | 12/2016 | Wen | G06F 21/00 718/1 |

OTHER PUBLICATIONS

Guo et al, I/O Virtualization Design of FCoE Adapter, 2015, IEEE, 2015 International Conference on Network and Information Systems for Computers, pp. 18-21.*

* cited by examiner

VERSATILE PROTECTED INPUT/OUTPUT DEVICE ACCESS AND ISOLATED SERVICING FOR VIRTUAL MACHINES

TECHNICAL FIELD

Embodiments described herein generally relate to information systems and related methodology and, more particularly, to a system architecture and operability for managing access to input/output devices by virtual machines.

BACKGROUND

In computer systems running multiple virtual machines (VMs) there is often a need to assign different input/output devices to the different VMs. Currently, input/output memory management unit (IOMMU) technologies allow an administrator to assign I/O device controllers to different VMs in various configurations, and supports address translations for I/O device direct memory access (DMA) data transfers.

Some I/O device controllers support multiple devices. In cases where there may be a need for two distinct I/O devices operating via one common controller to access DMA pages mapped to different VMs, presently-available I/O virtualization solutions introduce significant complexity. For instance, the single root I/O virtualization (SR-IOV) interface introduces a physical function-virtual function dichotomy model into I/O device controllers. The physical function may be made available to one VM, while virtual functionality may be made available to another VM. Due to its circuit complexity, practical SR-IOV devices tend to require a relatively large die size and, consequently, a high cost of fabrication.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

Figure 1:
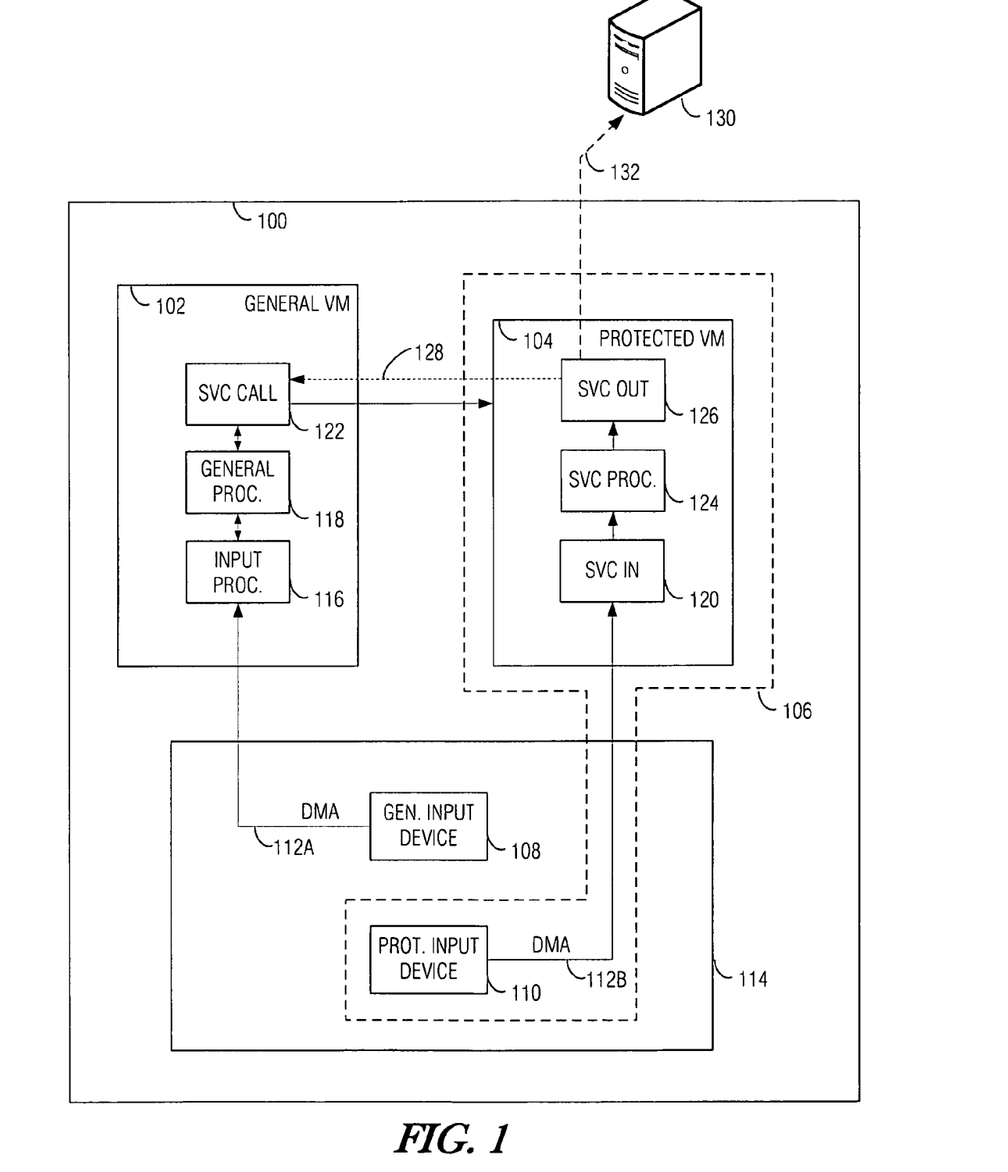
FIG. 1 is a high-level functional block diagram illustrating a system example and example operability scenario in which multiple VMs within a host machine utilize domain-dedicated input devices in cooperation to facilitate input data protection according to some embodiments.

Various aspects of the embodiments are directed to managing access to input/output devices by virtual machines (VMs). FIG. 1 is a high-level functional block diagram illustrating a system example and example operability scenario in which multiple VMs within a host machine utilize domain-dedicated input devices in cooperation to facilitate input data protection according to some embodiments. Host machine 100 may be a computer system having a hardware platform and system architecture according to the examples described in greater below. Host machine 100 hosts a general virtual machine (VM) 102, and a protected VM 104, as depicted.

In the example depicted, general VM 102 may be utilized as a general-purpose computing environment, having a graphical user interface (GUI), a variety of application programs, network connectivity under the user's control, etc., whereas protected VM 104 is reserved for certain protected operations that are isolated from accessibility by any of the processes running in general VM 102.

In various embodiments, suitable isolation provisions 106 are applied to ensure isolation of the data storage, registers, and memory space allocated to protected domain 104. In related embodiments, the instructions that, when executed, control the implementation of protected domain 104, are validated in a secure boot operation, such that only pre-authorized instructions may be executed to produce protected domain 104, and only pre-authorized instructions may be executed in protected domain 104.

In the present example, general VM 102 and protected VM 104 are each interfaced with one or more input devices. As depicted, general input device 108 is interfaced with general VM 102, and protected input device 110 is interfaced with protected VM 104.

General input device 108 is configured for direct memory access (DMA) into input processing engine 116, which in the present example represents a portion of the computing architecture and software stack that performs operations that access and utilize input from general input device 108. Input processing engine includes memory space allocated to general VM 102, into which DMA path 112A passes input information.

In similar fashion, protected input device 110 is configured for DMA into service input engine 120 of protected VM 104 via DMA path 112B. Notably, in this example, DMA path 112B is protected by isolation provisions 106, such that no portion of general VM 102 may access any of the information passed via DMA path 112B.

In a related embodiment, general input device 108 and protected input device 110 may be interfaced with host machine 100 via a common input/output (I/O) controller 114. In an aspect of the embodiments, I/O controller 114 includes provisions for facilitating distinct mappings of the individual input devices 108, 110 via a memory-mapped I/O (MMIO) scheme.

According to a related embodiment, some of the protected operations performed by protected VM 104 are applied to support certain operations of general VM 102. Therefore, general VM 102 and protected VM 104 may work collaboratively.

In an example scenario, protected VM 104 may implement a trusted computing environment that processes secure input from protected input device 110 on behalf of general VM 102. This type of arrangement may be applicable in processing sensitive information, such as login credentials, personally-identifying information, biometric data (e.g., fingerprint scans, iris images, etc.), photograph/video images from inside a private residence or business, scanned documents, and the like. Accordingly, protected input device 110 may be a keyboard, a security camera (e.g., infra-red camera), a fingerprint reader, a document scanner, a microphone, a video camera, or any other input device that may be capable of collecting sensitive information.

General VM 102 includes a general processing engine 118 that represents the functionality of one or more applications that utilize input/output devices. Further general VM 102 includes service call engine 122, which is programmed, or otherwise configured, to make a function call to protected VM 104 when access to protected input device 110 is needed by general processing engine 118.

Protected VM 104 accesses protected input device 110 via service input engine 120, which passes the data provided by protected input device 110 to service processing engine 124. Service processing engine 124 performs the called function as a service for the benefit of general VM 102. In an example, the called function may include user authentication based on a captured image obtained via protected input device 110.

For instance, the captured image may be a scan of the user's iris. The iris image is protected from access by general VM 102 (or any other process or computing entity) by isolation provision 106. Service processing engine 124 performs a comparison of the captured iris image (or some processed digest of the iris image) against a reference image or reference digest to produce an authentication decision.

The authentication decision, which is a result of the operation of service processing engine 124, is passed to service output engine 126. Service output engine 126 utilizes secure inter-VM communication channel 128 to communicate the result of the operation of service processing engine 124 to service call engine 122, which in turn returns the result to general processing engine 118. In a related embodiment, output engine 126 may sent the result to a remote destination, such as remote machine 130, via secure channel 132, such as a secure socket layer (SSL) connection, a virtual private network (VPN), or the like.

Notably, in this example operational scenario, the sensitive information obtained via protected input device 110 is never revealed to any process or entity outside of isolation provision 106. In the presently-discussed illustrative example, the information passed to service call engine 122 from service output engine 126 via secure inter-VM communication channel 128 is a user authentication result, which is a result of processing of the iris image, not any portion of the image itself.

In some embodiments, isolation provision 106 includes certain hardware provisions, such as an input/output memory management unit (IOMMU). Examples of IOMMU technologies that may be utilized include virtualization technology for directed I/O (e.g., VT-d). In related embodiments, the virtual machine that controls general VM 102 and protected VM 104 assures isolation between the VMs.

In a related embodiment, protected domain 104 performs configuration of I/O controller 114, including establishing, and managing, partitioning of multiple I/O paths, and assignment (and, in some embodiments, dynamic re-assignment) of I/O paths to respective VMs.

The example embodiments described herein may include, or may operate on, logic or a number of components, engines, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

Figure 2:
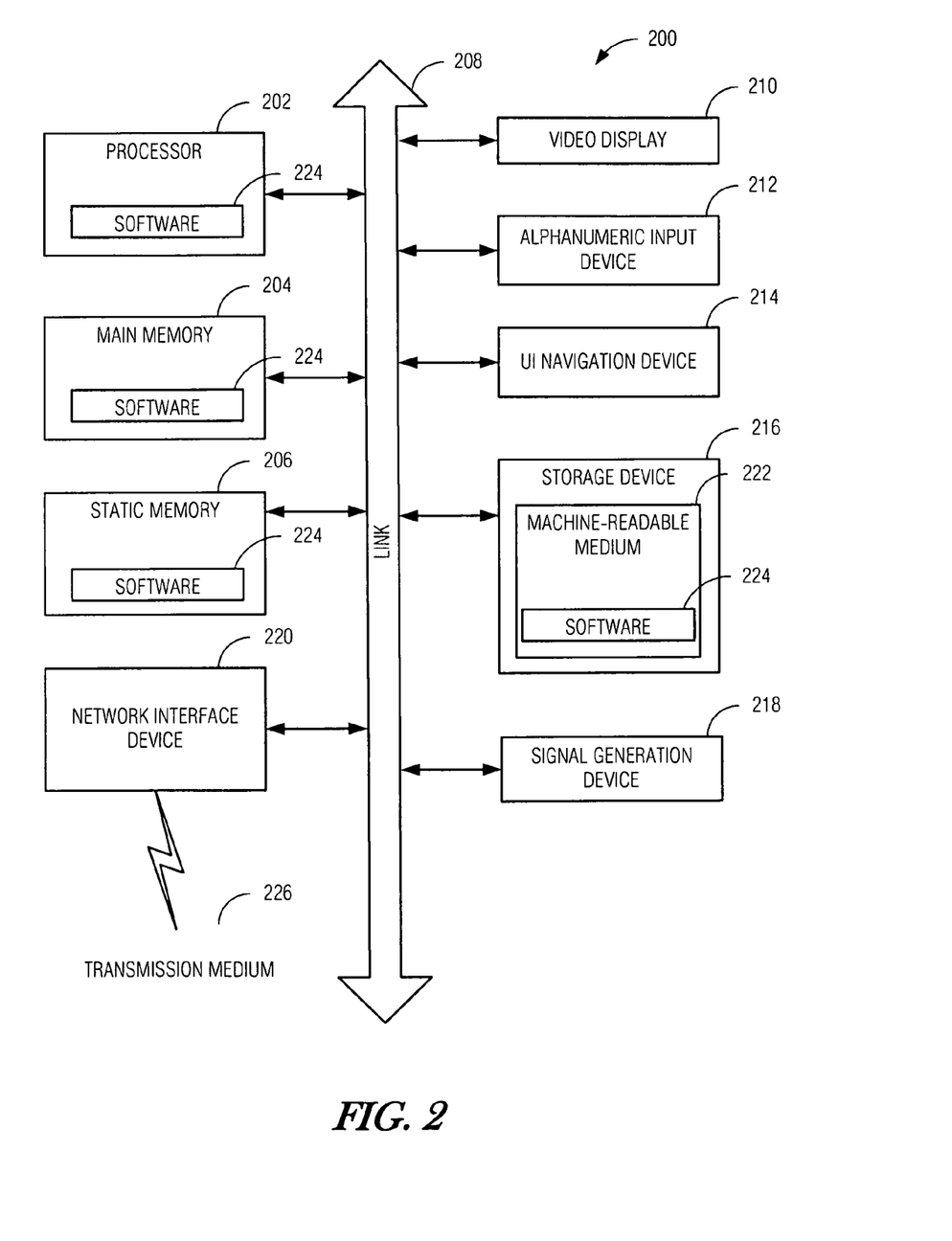
FIG. 2 is a block diagram illustrating a host machine, which may be an example of the host machine of FIG. 1, in the example form of a general-purpose computer system.

FIG. 2 is a block diagram illustrating a host machine, which may be an example of the host machine of FIG. 1, in the example form of a general-purpose computer system. In certain embodiments, programming of the computer system 200 according to one or more particular algorithms produces a special-purpose machine upon execution of that programming. In a networked deployment, the host machine may operate in the capacity of either a server or a client machine in server-client network environments, or it may act as a peer machine in peer-to-peer (or distributed) network environments. The host machine may take any suitable form factor, such as a personal computer (PC) workstation, a server, whether rack-mounted, or stand-alone, a mainframe computer, a cluster computing system, or the like, a set-top box, as well as a mobile or portable computing system, such as a laptop/notebook PC, an onboard vehicle system, wearable device, a tablet PC, a hybrid tablet, a personal digital assistant (PDA), a mobile telephone or, more generally, any machine capable of executing instructions (sequential or otherwise) that specify actions to be taken by that machine.

Example host machine 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The host machine 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The host machine 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the host machine 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
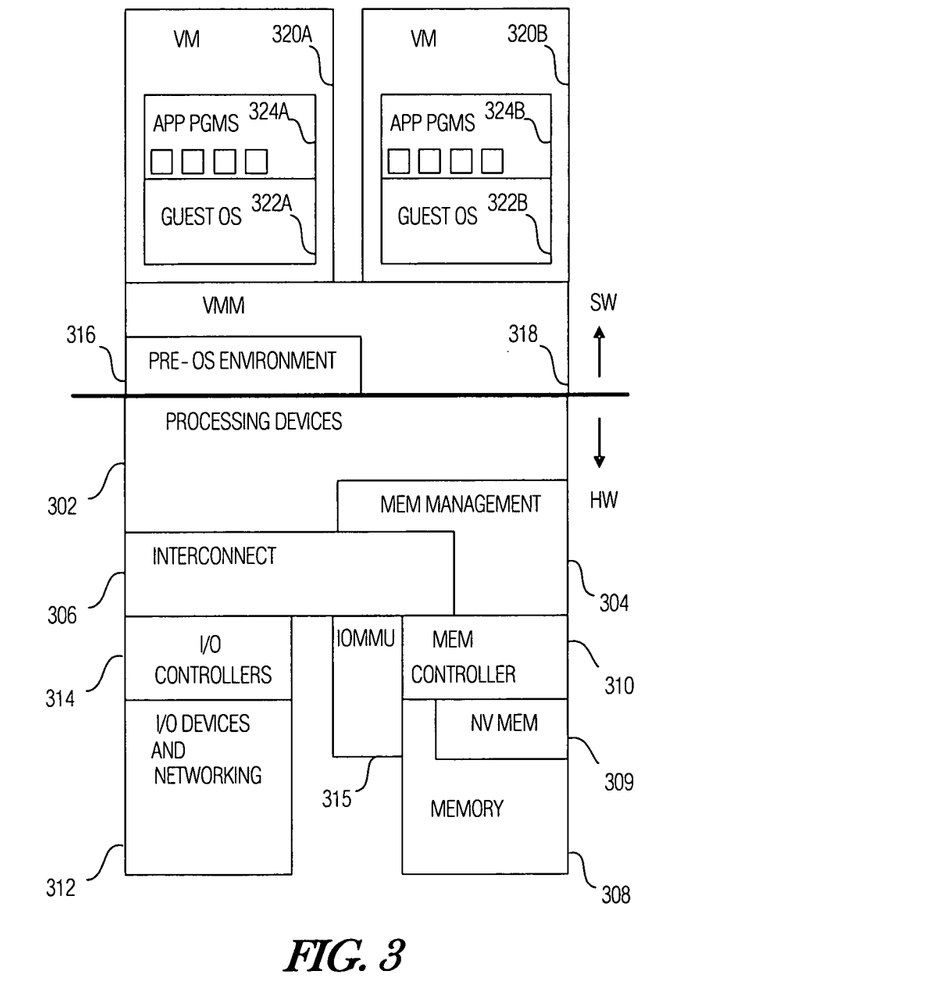
FIG. 3 is a diagram illustrating an exemplary hardware and software architecture of a computer system such as the one depicted in FIG. 2, in which various interfaces between hardware components and software components are shown.

FIG. 3 is a diagram illustrating an exemplary hardware and software architecture of a computer system such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. I/O devices, including video and audio adapters, non-volatile storage, external peripheral links such as USB, Bluetooth, etc., camera/microphone data capture devices, fingerprint readers and other biometric sensors, as well as network interface devices such as those communicating via Wi-Fi or LTE-family interfaces, are collectively represented as I/O devices and networking 312, which interface with interconnect 306 via corresponding I/O controllers 314.

In a related embodiment, input/output memory management unit IOMMU 315 supports secure direct memory access (DMA) by peripherals. IOMMU 315 may provide memory protection by meditating access to memory 308 from I/O device 312. IOMMU 315 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316 is responsible for initiating the launching of the operating system or virtual machine manager, but also provides an execution environment for embedded applications according to certain aspects of the invention.

Virtual machine monitor (VMM) 318 is system software that creates and controls the execution of virtual machines (VMs) 320A and 320B. VMM 318 may run directly on the hardware HW, as depicted, or VMM 318 may run under the control of an operating system as a hosted VMM.

Each VM 320A, 320B includes a guest operating system 322A, 322B, and application programs 324A, 324B.

Each guest operating system (OS) 322A, 322B provides a kernel that operates via the resources provided by VMM 318 to control the hardware devices, manage memory access for programs in memory, coordinate tasks and facilitate multi-tasking, organize data to be stored, assign memory space and other resources, load program binary code into memory, initiate execution of the corresponding application program which then interacts with the user and with hardware devices, and detect and respond to various defined interrupts. Also, each guest OS 322A, 322B provides device drivers, and a variety of common services such as those that facilitate interfacing with peripherals and networking, that provide abstraction for corresponding application programs 324A, 324B so that the applications do not need to be responsible for handling the details of such common operations. Each guest OS 322A, 322B additionally may provide a graphical user interface (GUI) that facilitates interaction with the user via peripheral devices such as a monitor, keyboard, mouse, microphone, video camera, touchscreen, and the like. In some embodiments, guest OS 322B may omit a GUI.

Each guest OS 322A, 322B may provide a runtime system that implements portions of an execution model, including such operations as putting parameters onto the stack before a function call, the behavior of disk input/output (I/O), and parallel execution-related behaviors.

In addition, each guest OS 322A, 322B may provide libraries that include collections of program functions that provide further abstraction for application programs. These include shared libraries, dynamic linked libraries (DLLs), for example.

Application programs 324A, 324B are those programs that perform useful tasks for users, beyond the tasks performed by lower-level system programs that coordinate the basis operability of the computer system itself.

Figure 4:
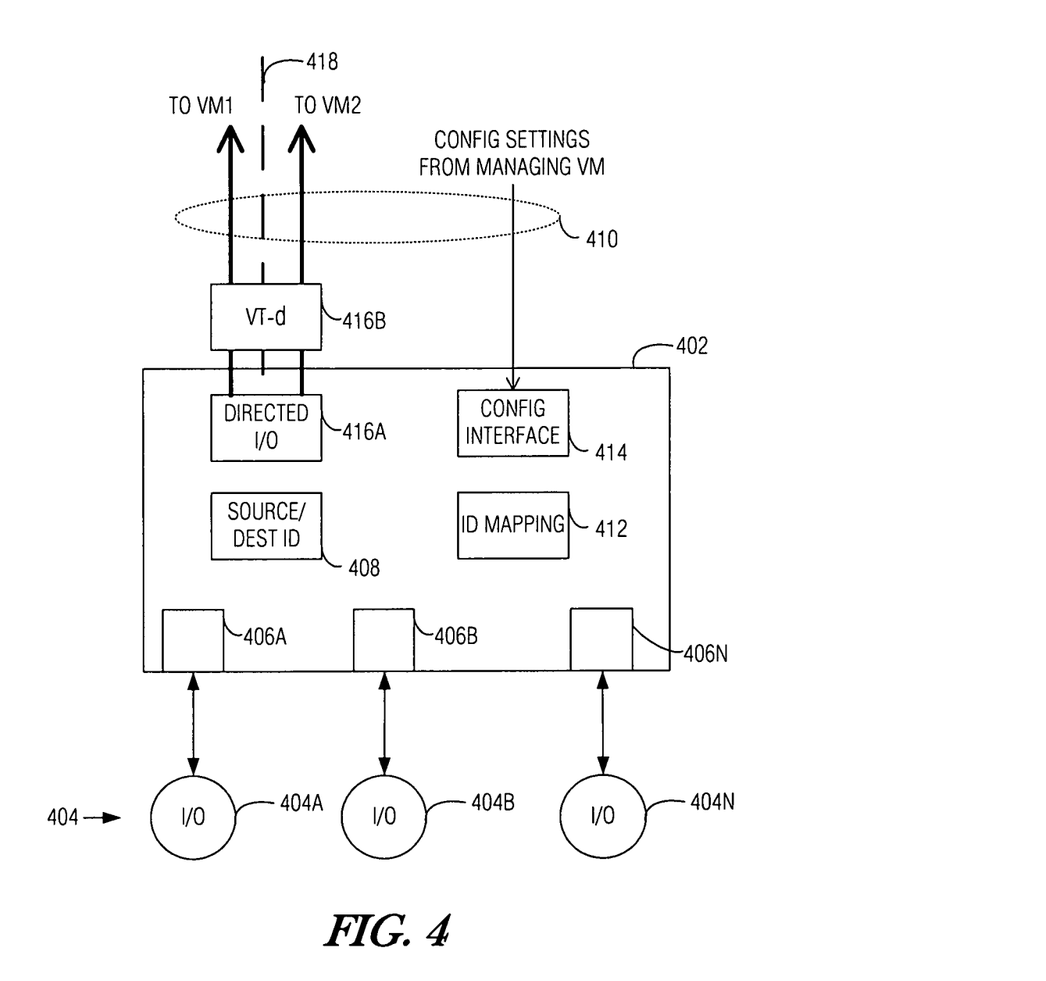
FIG. 4 is a block diagram illustrating an I/O device controller according to some embodiments.

FIG. 4 is a block diagram illustrating an I/O device controller according to some embodiments. In this example, I/O device controller 402 may be considered as a type of I/O controller 314. I/O device controller 402 supports multiple I/O devices 404A, 404B, . . . , 404N (collectively, 404). Each I/O device 404 is interfaced via corresponding interface circuitry 406A, 406B, . . . , 406N. As an example, I/O device controller 402 may be a universal serial bus (USB) controller. I/O devices 404 may be devices of the same type, or they may be a mixed set of diverse I/O devices.

I/O device controller 402 includes source/destination ID generator engine 408, which is configured to provide individualized source/destination identification to each I/O device 404 in the address space of interconnect 410. In this example, interconnect 410 may be considered as a type of interconnect 306. For instance, interconnect 410 may be a Peripheral Component Interconnect Express (PCIe). In various other embodiments, interconnect 410 may be realized using InfiniBand, RapidIO, HyperTransport, or some other suitable interconnect type. In the case of PCIe, for example, source/destination ID generator engine 408 assigns a bus/device/function (BDF) configuration space to individual I/O devices 404. In various related embodiments, multiple I/O devices 404 in various groupings may be selectively assigned to a common source/destination ID.

In a related embodiment, each I/O device 404 is further assigned to a corresponding VM. The I/O device-VM assignment is represented by ID mapping engine 412, which may include a specific programmable register to store the I/O device-VM assignments. The content of the programmable register is variable, and may be subject to the control of a manager VM that supplies configuration settings via configuration interface 414. In some embodiments, the source/destination ID assigned to each I/O device 404 serves as the I/O device-VM assignment.

Directed I/O engine 416A is configured to communicate input data received from each of the I/O devices 404 (that are operating as input devices) on interconnect 410 in association with the corresponding assigned source ID for each I/O device 404. The communication may be directed to DMA memory pages corresponding to the assigned VM for each active I/O device.

In a related embodiment, the function of directed I/O engine 416A may be performed by conventional VTd device 416B.

Isolation provision 418 operates to ensure that communications are directed to the corresponding assigned VM. In an embodiment, isolation provision 418 is enforced by a VT-d device. In related embodiments, the VT-d device also performs address translation to support DMA transactions issued by I/O devices 404.

Figure 5:
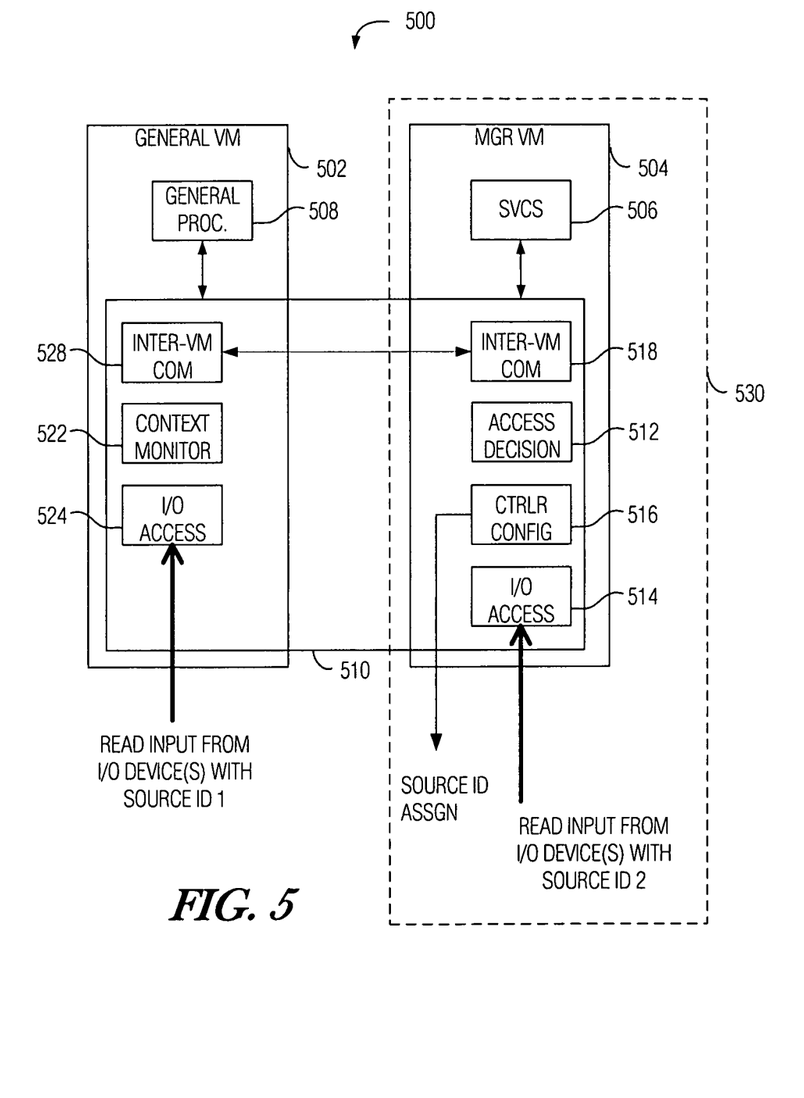
FIG. 5 is a block diagram illustrating VM-based components for configuring and controlling access to I/O devices accessible via the I/O controller of FIG. 4 according to some embodiments.

FIG. 5 is a block diagram illustrating VM-based components for configuring and controlling access to I/O devices accessible via the I/O controller of FIG. 4 according to some embodiments. In system 500, the example VM-based components reside as parts of general VM 502, and manager VM 504, which are both hosted on a common host machine. Although only two VMs are presented in this example for the sake of clarity, it will be understood that there may be additional general or specialized VMs hosted by the host machine. In the present discussion, general VM 502 is representative of any other VM that may be present. General VM 502 may be regarded as an example embodiment of general VM 102, whereas manager VM 504 may be regarded as an example embodiment of protected VM 104. Here, manager VM 504 performs a specialized role of configuring, and managing the operation, of I/O device controller 402. Notably, there is a hierarchical arrangement between manager VM 504 and general VM 502 insofar as I/O device access is concerned, with manager VM 504 taking a superior role in the accessing and controlling of I/O devices 404. In a related embodiment, there may be one or more additional manager VMs having a same or similar hierarchical level as manager VM 504. For the sake of clarity, the embodiments described herein will treat manager VM 504 as representative of any other manager VMs that may be present on the host machine.

In some embodiments, manager VM 504 is configured to execute services 506 for the benefit of general VM 502. Services 506 may include such operations as user authentication based on protected input received from one or more I/O devices 404. In various related embodiments, other types of services may be performed, such as, for example, video motion detection, cryptographic operations, database query submission, secure data storage, secure Web browsing, access credential entry, financial transaction entry, security-related operations (e.g., anti-malware tasks), system update/restoration, debugging, and the like. In a related embodiment, manager VM is a trusted computing environment in which only validated software code is executed.

General VM 502 includes general-processing computing environment 508 that is operated under the control of the user. In this example, general VM 502 is considered to be a non-trusted computing environment due to the possibility that malicious or buggy software may be introduced by the user, or as a consequence of the user's activity. Accordingly, system 500 may control and limit access of general VM 502 to certain I/O devices 404. Manager VM 504 may be further protected by isolation provisions 530 to ensure that its processes and memory space are inaccessible to other VMs or other computing entities, except for inter-VM communications that are closely controlled.

General VM 502 and manager VM 504 each accesses I/O devices 404 via I/O device controller driver 510. I/O device controller driver 510 includes various components installed in general VM 502, and in manager VM 504. In some embodiments, manager VM 504 is given exclusive control over I/O device controller 402. In related embodiments, manager VM 504 also serves as the arbiter of access to I/O devices 404 by general VM 502.

According to some embodiments, access decision engine 512 includes decision criteria and instructions for applying the decision criteria, for configuring, or re-configuring, I/O device controller 402 in support of the operation of general VM 502. I/O access engine 514 accesses I/O devices 404 via I/O controller 402. In an operational scenario as an example, I/O access engine 514 may read input from one or more I/O devices with a source ID of 2. Although not explicitly illustrated, I/O access engine 514 may also write output data to be output by I/O devices 404 that are operating as output devices.

Controller configuration engine 516 assigns source/destination IDs to the various I/O devices 404. This assignment information may be saved in ID mapping engine 412 in I/O device controller 402. In some embodiments, the source/destination ID may be dynamically re-assigned during runtime operation to adjust the access being granted or prevented to I/O devices 404 by general VM 502. Controller configuration engine 516 writes configuration parameters to be accessed by configuration interface 414 of I/O device controller 402.

Inter-VM communication engine 518 performs operations to interact with counterpart inter-VM communication engine 528 of general VM 502. A variety of information may be communicated between the VMs based on operational configurations, services 506, and I/O device usage by general VM 502. For example, general VM 502 may request an I/O-related service from manager VM 504 via inter VM communication engine 528, and may receive the service output in response.

In some embodiments, context monitor engine 522 is configured to collect operational context information relating to performed I/O activity and desired I/O activity, and to provide the operational context information to access decision engine 512 via inter-VM communication engine 528. As an illustrative example, operational context information may indicate the application program calling to use a particular I/O device 404. Context monitor engine 522 may also determine and report an operational objective for use of the requested I/O device, such as user authentication, access credential entry, biometric data collection, etc.

In response to the operational context information, access decision engine 512 may assess a suitable I/O device access configuration according to an applicable security policy. For example, if a video-conferencing application is requesting access to a video camera and microphone, access decision engine 512 may grant access to those I/O devices. Accordingly, access decision engine 512 may instruct controller configuration engine 516 to set a source ID for the camera and microphone to source ID=1, which is the source ID that is mapped to general VM 502 in the illustrated example.

In another use case, in response to context monitor 522 reporting a request by a Web-browser application to access a fingerprint scanner for the purpose of logging in to a secure site, access decision engine 512 may not grant general VM 502 access to the I/O device. Instead, access decision engine 512 will report a call for services engine 506 to access the fingerprint scanner device, perform user authentication, and report the result to general processing engine 508.

I/O access engine 524 accesses I/O devices 404 via I/O controller 402. In an operational scenario as an example, I/O access engine 524 may only read input from one or more I/O devices having a source ID of 1. Although not explicitly illustrated, I/O access engine 524 may also write output data to be output by I/O devices 404 that are operating as output devices with an appropriate destination ID corresponding to general VM 502.

In some embodiments, whenever general VM 502 needs to access an I/O device 404, it first tries to directly access those devices which are configured with a source ID of 1 to determine if the needed I/O device is available. If it is available, VM 502 proceeds to directly access that device via I/O access engine 524. However, if the needed I/O device is not accessible (or not visible) to general VM 502, then I/O access engine 524 defers to manager VM 504 to either obtain direct access (at the discretion of the decision logic of access decision engine 512) to the I/O device, or to obtain a service result from manager VM 504 based on use of the I/O device to be accessed by manager VM 504.

Figure 6:
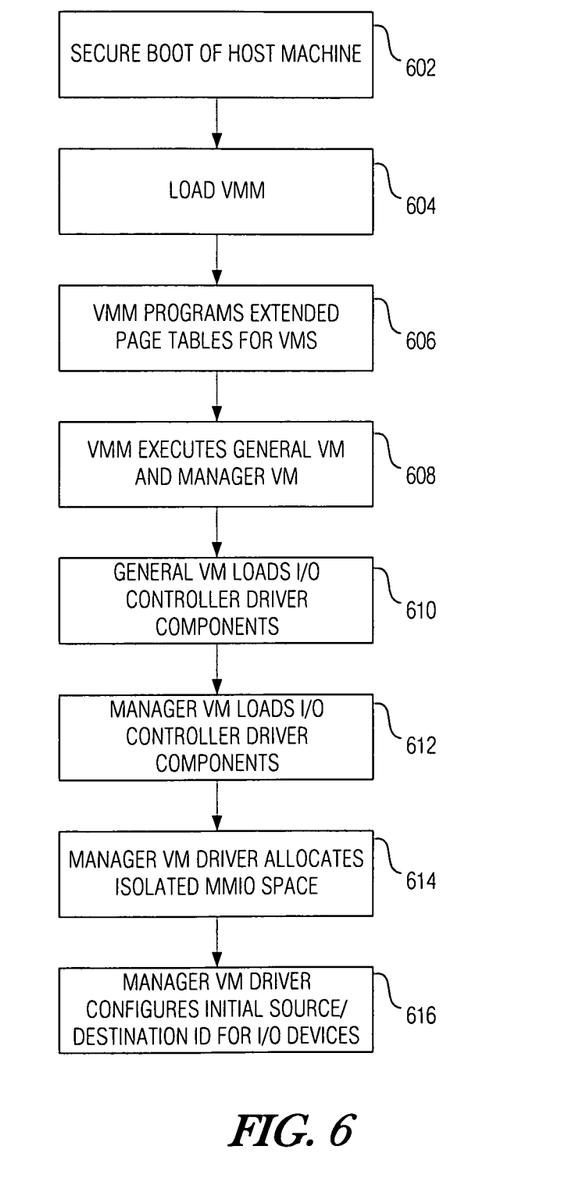
FIG. 6 is a flow diagram illustrating a process for initializing the system depicted in FIGS. 4-5 according to some embodiments.

FIG. 6 is a flow diagram illustrating a process for initializing the system depicted in FIGS. 4-5 according to some embodiments. At 602 the host machine initiates a secure boot process. In an embodiment, the UEFI is validated and executed to supervise the subsequent boot-up operations. At 604 the virtual machine monitor (VMM) is loaded and executed. At 606 the VMM allocates system memory in the form of extended page tables to accommodate the distinct VMs. At 608, the VMM instantiates the general VM and the manager VM.

At 610, the general VM loads its I/O controller driver components as part of its OS loading sequence. At 612, the manager VM loads its I/O controller driver components as part of its corresponding OS loading sequence. At 614, the manager VM I/O controller driver allocates MMIO space in its allocated memory partition to support its operations. At 616, the manager VM I/O controller driver configures the I/O controller with initial source/destination IDs for the various detected I/O devices. This initial configuration may be based on a prior configuration achieved during run-time and saved for future use, or it may be based on I/O device metadata such as type of device, and on a set of initial setup criteria. In a related embodiment, operation 616 may be executed during runtime to address a secure device request on demand, and may transfer control of the device to the general VM when secure operation is complete.

ADDITIONAL NOTES & EXAMPLES

Example 1 is a system for managing access to input/output devices by virtual machines (VMs), the system comprising computing hardware, including a processor coupled to a data store and a plurality of input/output (I/O) devices interfaced with the processor via an I/O device controller, the computing hardware containing instructions that, when executed, cause the computing hardware to: implement a first VM and a second VM; implement an I/O device controller driver including a first driver portion in the first VM and a second driver portion in the second VM; wherein the first driver portion includes a configuration engine to configure the I/O device controller with I/O device-VM mappings, wherein a first I/O device is mapped exclusively to the first VM, and a second I/O device is mapped to at least the second VM; wherein the second VM includes a general processing engine to call for I/O devices via the second driver portion, and wherein in response to a call by the general processing engine for access to the first I/O device, the second driver portion is to send an access request to the first driver portion In Example 2, the subject matter of Example 1 optionally includes, wherein the instructions, when executed, cause the computing hardware to further implement an isolation provision that isolates allocated data storage space of the first VM and the first I/O device from the second VM.

In Example 3, the subject matter of any one or more of Examples 1-2 optionally include, wherein the configuration engine is further to reconfigure the I/O device-VM mappings in response to the access request to allocate the first I/O device to the second VM.

In Example 4, the subject matter of any one or more of Examples 1-3 optionally include, wherein the first VM includes a services engine to access the first I/O device in response to the access request.

In Example 5, the subject matter of any one or more of Examples 1-4 optionally include, wherein the first VM includes a services engine to, in response to the access request, access data from the first I/O device, process the data from the first I/O device to produce a processing result, and pass the processing result to the second VM.

In Example 6, the subject matter of any one or more of Examples 1-5 optionally include, wherein the first VM includes a services engine to, in response to the access request, access data from the first I/O device, process the data from the first I/O device to produce a processing result, and pass the processing result to be accessed by a remote machine.

In Example 7, the subject matter of any one or more of Examples 1-6 optionally include, wherein the first I/O device is a security-related I/O device.

In Example 8, the subject matter of any one or more of Examples 1-7 optionally include, wherein the first I/O device is an iris-recognition camera.

In Example 9, the subject matter of any one or more of Examples 1-8 optionally include, wherein the first I/O device is a user-authentication-related I/O device.

In Example 10, the subject matter of any one or more of Examples 1-9 optionally include, wherein the access request is to be sent via an inter-VM communication channel.

In Example 11, the subject matter of any one or more of Examples 1-10 optionally include, wherein the I/O device controller includes a dedicated register to store the I/O device-VM mappings.

In Example 12, the subject matter of any one or more of Examples 1-11 optionally include, wherein the I/O device controller is to generate a source ID for the first I/O device based on the I/O device-VM mappings.

Example 13 is at least one computer-readable medium containing instructions that, when executed by a computing system comprising a hardware processor coupled to a data store and a plurality of input/output (I/O) devices interfaced with the hardware processor via an I/O device controller, cause the computing system to: implement a first VM and a second VM; implement an I/O device controller driver including a first driver portion in the first VM and a second driver portion in the second VM; the first driver portion including a configuration engine to configure the I/O device controller with I/O device-VM mappings, wherein a first I/O device is mapped exclusively to the first VM, and a second I/O device is mapped to at least the second VM; and the second VM including a general processing engine to call for I/O devices via the second driver portion, and wherein in response to a call by the general processing engine for access to the first I/O device, the second driver portion is to send an access request to the first driver portion In Example 14, the subject matter of Example 13 optionally includes, wherein the instructions, when executed, cause the computing hardware to further implement an isolation provision that isolates allocated data storage space of the first VM and the first I/O device from the second VM.

In Example 15, the subject matter of any one or more of Examples 13-14 optionally include, wherein the configuration engine is further to reconfigure the I/O device-VM mappings in response to the access request to allocate the first I/O device to the second VM.

In Example 16, the subject matter of any one or more of Examples 13-15 optionally include, wherein the first VM includes a services engine to access the first I/O device in response to the access request.

In Example 17, the subject matter of any one or more of Examples 13-16 optionally include, wherein the first VM includes a services engine to, in response to the access request, access data from the first I/O device, process the data from the first I/O device to produce a processing result, and pass the processing result to the second VM.

In Example 18, the subject matter of any one or more of Examples 13-17 optionally include, wherein the first VM includes a services engine to, in response to the access request, access data from the first I/O device, process the data from the first I/O device to produce a processing result, and pass the processing result to be accessed by a remote machine.

In Example 19, the subject matter of any one or more of Examples 13-18 optionally include, wherein the first I/O device is a security-related I/O device.

In Example 20, the subject matter of any one or more of Examples 13-19 optionally include, wherein the first I/O device is an iris-recognition camera.

In Example 21, the subject matter of any one or more of Examples 13-20 optionally include, wherein the first I/O device is a user-authentication-related I/O device.

In Example 22, the subject matter of any one or more of Examples 13-21 optionally include, wherein the access request is to be sent via an inter-VM communication channel.

In Example 23, the subject matter of any one or more of Examples 13-22 optionally include, wherein the I/O device controller includes a dedicated register to store the I/O device-VM mappings.

In Example 24, the subject matter of any one or more of Examples 13-23 optionally include, wherein the I/O device controller is to generate a source ID for the first I/O device based on the I/O device-VM mappings.

Example 25 is a method for managing access to input/output devices by virtual machines (VMs) executing on a computing system that includes input/output (I/O) devices interfaced with a processor via an I/O device controller, the method comprising: executing, by the computing system, a first VM and a second VM; loading, by the computing system, an I/O device controller driver including a first driver portion in the first VM and a second driver portion in the second VM; configuring the I/O device controller with I/O device-VM mappings to map the first I/O device exclusively to the first VM, and a second I/O device to at least the second VM; and sending an access request by the second driver portion to the first driver portion in response to a call for the second VM to access the first I/O device via the second driver portion In Example 26, the subject matter of Example 25 optionally includes, further comprising: implementing an isolation provision that isolates allocated data storage space of the first VM and the first I/O device from the second VM.

In Example 27, the subject matter of any one or more of Examples 25-26 optionally include, further comprising: reconfiguring the I/O device-VM mappings in response to the access request to allocate the first I/O device to the second VM.

In Example 28, the subject matter of any one or more of Examples 25-27 optionally include, further comprising: accessing, by the first VM, the first I/O device in response to the access request.

In Example 29, the subject matter of any one or more of Examples 25-28 optionally include, further comprising: in response to the access request: accessing, by the first VM, data from the first I/O device, processing the data from the first I/O device to produce a processing result; and passing the processing result to the second VM.

In Example 30, the subject matter of any one or more of Examples 25-29 optionally include, further comprising: in response to the access request: accessing, by the first VM, data from the first I/O device, processing the data from the first I/O device to produce a processing result; and passing the processing result to be accessed by a remote machine.

In Example 31, the subject matter of any one or more of Examples 25-30 optionally include, wherein the first I/O device is a security-related I/O device.

In Example 32, the subject matter of any one or more of Examples 25-31 optionally include, wherein the first I/O device is an iris-recognition camera.

In Example 33, the subject matter of any one or more of Examples 25-32 optionally include, wherein the first I/O device is a user-authentication-related I/O device.

In Example 34, the subject matter of any one or more of Examples 25-33 optionally include, wherein the access request sent via an inter-VM communication channel.

In Example 35, the subject matter of any one or more of Examples 25-34 optionally include, further comprising: storing the I/O device-VM mappings in the I/O device controller.

In Example 36, the subject matter of any one or more of Examples 25-35 optionally include, further comprising: generating, by the I/O device controller, a source ID for the first I/O device based on the I/O device-VM mappings.

Example 37 is apparatus for managing access to input/output devices by virtual machines (VMs) executing on a computing system that includes input/output (I/O) devices interfaced with a processor via an I/O device controller, the apparatus comprising: means for executing a first VM and a second VM; and means for instantiating an I/O device controller driver including a first driver portion in the first VM and a second driver portion in the second VM; means for configuring the I/O device controller with I/O device-VM mappings to map the first I/O device exclusively to the first VM, and a second I/O device to at least the second VM; and means for sending an access request by the second driver portion to the first driver portion in response to a call for the second VM to access the first I/O device via the second driver portion In Example 38, the subject matter of Example 37 optionally includes, further comprising: means for isolating allocated data storage space of the first VM and the first I/O device from the second VM.

In Example 39, the subject matter of any one or more of Examples 37-38 optionally include, further comprising: means for reconfiguring the I/O device-VM mappings in response to the access request to allocate the first I/O device to the second VM.

In Example 40, the subject matter of any one or more of Examples 37-39 optionally include, further comprising: means for accessing, by the first VM, the first I/O device in response to the access request.

In Example 41, the subject matter of any one or more of Examples 37-40 optionally include, further comprising: means for accessing, by the first VM, data from the first I/O device in response to the access request; means for processing the data from the first I/O device to produce a processing result; and means for passing the processing result to the second VM.

In Example 42, the subject matter of any one or more of Examples 37-41 optionally include, further comprising: means for accessing, by the first VM, data from the first I/O device in response to the access request; means for processing the data from the first I/O device to produce a processing result; and means for passing the processing result to be accessed by a remote machine.

In Example 43, the subject matter of any one or more of Examples 37-42 optionally include, wherein the first I/O device is a security-related I/O device.

In Example 44, the subject matter of any one or more of Examples 37-43 optionally include, wherein the first I/O device is an iris-recognition camera.

In Example 45, the subject matter of any one or more of Examples 37-44 optionally include, wherein the first I/O device is a user-authentication-related I/O device.

In Example 46, the subject matter of any one or more of Examples 37-45 optionally include, wherein the access request sent via an inter-VM communication channel.

In Example 47, the subject matter of any one or more of Examples 37-46 optionally include, further comprising: means for storing the I/O device-VM mappings in the I/O device controller.

In Example 48, the subject matter of any one or more of Examples 37-47 optionally include, further comprising: means for generating, by the I/O device controller, a source ID for the first I/O device based on the I/O device-VM mappings.

In Example 49, at least one computer-readable medium containing instructions that, when executed by a computing system that includes input/output (I/O) devices interfaced with a processor via an I/O device controller, cause the computing system to implement the subject matter of any one or more of Examples 25-36.

In Example 50, an apparatus for managing access to input/output devices by virtual machines (VMs), comprises means for carrying the method according to any one or more of Examples 25-36.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing access to input/output devices by virtual machines (VMs), the system comprising computing hardware, including a processor coupled to a data store and a plurality of input/output (I/O) devices interfaced with the processor via an I/O device controller, the computing hardware containing instructions that, when executed, cause the computing hardware to:
   implement a first VM and a second VM;
   implement an I/O device controller driver including a first driver portion in the first VM and a second driver portion in the second VM;
   wherein the first driver portion includes a configuration engine to configure the I/O device controller with I/O device-VM mappings, wherein a first I/O device is mapped exclusively to the first VM, and a second I/O device is mapped to at least the second VM;
   wherein the second VM includes a general processing engine to call for I/O devices via the second driver portion, and wherein in response to a call by the general processing engine for access to the first I/O device, the second driver portion is to send an access request to the first driver portion; and
   wherein the first VM includes a services engine to, in response to the access request, access data from the first I/O device, process the data from the first I/O device to produce a processing result, and pass the processing result to a services recipient, without exposing the data from the first I/O device to the second VM.

2. The system of claim 1, wherein the instructions, when executed, cause the computing hardware to further implement an isolation provision that isolates allocated data storage space of the first VM and the first I/O device from the second VM.

3. The system of claim 1, wherein the configuration engine is further to reconfigure the I/O device-VM mappings in response to the access request to allocate the first I/O device to the second VM.

4. The system of claim 1, wherein the access request is to be sent via an inter-VM communication channel.

5. The system of claim 1, wherein the I/O device controller includes a dedicated register to store the I/O device-VM mappings.

6. The system of claim 1, wherein the I/O device controller is to generate a source ID for the first I/O device based on the I/O device-VM mappings.

7. The system of claim 1, wherein the services recipient includes the second VM.

8. The system of claim 1, wherein the services recipient includes a remote machine.

9. The system of claim 1, wherein the first I/O device is a user-authentication-related I/O device and wherein the processing result represents a result of a user-authentication process performed by the first VM.

10. At least one non-transitory computer-readable storage medium containing instructions that, when executed by a computing system comprising a hardware processor coupled to a data store and a plurality of input/output (I/O) devices interfaced with the hardware processor via an I/O device controller, cause the computing system to:
    implement a first VM and a second VM;
    implement an I/O device controller driver including a first driver portion in the first VM and a second driver portion in the second VM;
    the first driver portion including a configuration engine to configure the I/O device controller with I/O device-VM mappings, wherein a first I/O device is mapped exclusively to the first VM, and a second I/O device is mapped to at least the second VM; and
    the second VM including a general processing engine to call for I/O devices via the second driver portion, and wherein in response to a call by the general processing engine for access to the first I/O device, the second driver portion is to send an access request to the first driver portion; and
    wherein the first VM includes a services engine to, in response to the access request, access data from the first I/O device, process the data from the first I/O device to produce a processing result, and pass the processing result to a services recipient, without exposing the data from the first I/O device to the second VM.

11. The at least one computer-readable medium of claim 10, wherein the instructions, when executed, cause the computing hardware to further implement an isolation provision that isolates allocated data storage space of the first VM and the first I/O device from the second VM.

12. The at least one computer-readable medium of claim 10, wherein the configuration engine is further to reconfigure the I/O device-VM mappings in response to the access request to allocate the first I/O device to the second VM.

13. The at least one computer-readable medium of claim 10, wherein the I/O device controller includes a dedicated register to store the I/O device-VM mappings.

14. The at least one computer-readable medium of claim 10, wherein the I/O device controller is to generate a source ID for the first I/O device based on the I/O device-VM mappings.

15. The at least one computer-readable medium of claim 10, wherein the services recipient includes the second VM.

16. The at least one computer-readable medium of claim 10, wherein the services recipient includes a remote machine.

17. The at least one computer-readable medium of claim 10, wherein the first I/O device is a user-authentication-related I/O device and wherein the processing result represents a result of a user-authentication process performed by the first VM.

18. A method for managing access to input/output devices by virtual machines (VMs) executing on a computing system that includes input/output (I/O) devices interfaced with a processor via an I/O device controller, the method comprising:
    executing, by the computing system, a first VM and a second VM;
    loading, by the computing system, an I/O device controller driver including a first driver portion in the first VM and a second driver portion in the second VM;

configuring the I/O device controller with I/O device-VM mappings to map the first I/O device exclusively to the first VM, and a second I/O device to at least the second VM;

sending an access request by the second driver portion to the first driver portion in response to a call for the second VM to access the first I/O device via the second driver portion; and in response to the access request, accessing data from the first I/O device by the first VM, and processing the data from the first I/O device by the first VM to produce a processing result, and pass the processing result to a services recipient, without exposing the data from the first I/O device to the second VM.

19. The method of claim 18, further comprising:

implementing an isolation provision that isolates allocated data storage space of the first VM and the first I/O device from the second VM.

20. The method of claim 18, further comprising:
reconfiguring the I/O device-VM mappings in response to the access request to allocate the first I/O device to the second VM.

21. The method of claim 18, further comprising:
storing the I/O device-VM mappings in the I/O device controller.

22. The method of claim 18, further comprising:
generating, by the I/O device controller, a source ID for the first I/O device based on the I/O device-VM mappings.

23. The method of claim 18, wherein the services recipient includes the second VM.

24. The method of claim 18, wherein the services recipient includes a remote machine.

25. The method of claim 18, wherein the first I/O device is a user-authentication-related I/O device and wherein the processing result represents a result of a user-authentication process performed by the first driver portion.

* * * * *

UNITED STATES PATENT AND TRADEMARK OFFICE
CERTIFICATE OF CORRECTION

PATENT NO. : 9,846,592 B2  
APPLICATION NO. : 14/757417  
DATED : December 19, 2017  
INVENTOR(S) : Sarangdhar et al.

Page 1 of 1

It is certified that error appears in the above-identified patent and that said Letters Patent is hereby corrected as shown below:

On the Title Page

Item (72), in "Inventors", in Column 1, Line 2, after "Ioannis", delete "Yannis"

Signed and Sealed this
Seventh Day of December, 2021

Drew Hirshfeld
*Performing the Functions and Duties of the
Under Secretary of Commerce for Intellectual Property and
Director of the United States Patent and Trademark Office*